United States Patent
Balgobin et al.

(10) Patent No.: US 12,378,950 B2
(45) Date of Patent: Aug. 5, 2025

(54) CONTROLLED DEPLOYMENT OF SHAPE-MEMORY ARTICLES

(71) Applicant: Baker Hughes Oilfield Operations LLC, Houston, TX (US)

(72) Inventors: Amrit Balgobin, Houston, TX (US); Jason Harper, Cypress, TX (US); Jose Pedreira, Fulshear, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/350,282

(22) Filed: Jul. 11, 2023

(65) Prior Publication Data

US 2025/0020110 A1 Jan. 16, 2025

(51) Int. Cl.
E21B 33/12 (2006.01)
F03G 7/06 (2006.01)

(52) U.S. Cl.
CPC ........ F03G 7/0614 (2021.08); E21B 33/1208 (2013.01); *E21B 2200/08* (2020.05)

(58) Field of Classification Search
CPC . F03G 7/0614; E21B 33/1208; E21B 2200/08
See application file for complete search history.

(56) References Cited

U.S. PATENT DOCUMENTS

| | | |
|---|---|---|
| 3,956,508 A | 5/1976 | Mitchell et al. |
| 4,741,401 A * | 5/1988 | Walles ................ C09K 8/706 166/308.5 |
| 8,240,392 B2 | 8/2012 | Barnard et al. |
| 9,029,299 B2 | 5/2015 | Crews et al. |
| 10,508,185 B2 | 12/2019 | Murugesan et al. |
| 2005/0167104 A1* | 8/2005 | Roddy ................ C09K 8/473 166/279 |
| 2008/0206325 A1 | 8/2008 | Bouquerand et al. |
| 2010/0089565 A1* | 4/2010 | Duan .................. E21B 43/082 166/278 |
| 2010/0181080 A1 | 7/2010 | Levy |

(Continued)

FOREIGN PATENT DOCUMENTS

WO 2023091890 A1 5/2023

OTHER PUBLICATIONS

International Search Report & Written Opinion for International Application No. PCT/US2024/036737, International Filing Date Jul. 3, 2024, Date of Mailing Oct. 21, 2024, 7 pages.

*Primary Examiner* — Taras P Bemko
(74) *Attorney, Agent, or Firm* — Baker Hughes Patent Organization

(57) ABSTRACT

A downhole assembly includes a support structure; a shape-memory article disposed at the support structure; and a deployment control element adjacent the shape-memory article, the deployment control element having a permeable or degradable wall defining a chamber and an activation material disposed in the chamber. A method includes introducing the downhole assembly into a wellbore, wherein the downhole assembly is disposed when the shape-memory article is in a compacted shape; exposing the downhole assembly to a wellbore fluid; releasing the activation material from the deployment control element; and contacting the shape-memory article in the compacted shape with the released activation material to cause the shape-memory article to expand, and conform to a surface of the wellbore.

16 Claims, 3 Drawing Sheets

(56) References Cited

U.S. PATENT DOCUMENTS

| | | | |
|---|---|---|---|
| 2011/0186306 A1* | 8/2011 | Marya | E21B 33/12 |
| | | | 166/386 |
| 2013/0056209 A1 | 3/2013 | Mazyar et al. | |
| 2013/0062061 A1* | 3/2013 | Taylor | E21B 33/13 |
| | | | 166/288 |
| 2013/0126170 A1* | 5/2013 | Johnson | E21B 33/1208 |
| | | | 166/373 |
| 2014/0284046 A1* | 9/2014 | Bramwell | E21B 33/1208 |
| | | | 166/66.5 |
| 2017/0101572 A1* | 4/2017 | Qu | C09K 8/70 |
| 2017/0292366 A1 | 10/2017 | Ventura et al. | |
| 2017/0362405 A1* | 12/2017 | Murugesan | C08J 9/36 |
| 2021/0292638 A1* | 9/2021 | Chopade | C09K 8/805 |
| 2021/0324712 A1* | 10/2021 | Sladic | E21B 43/088 |
| 2023/0160276 A1* | 5/2023 | Fripp | C22C 23/06 |
| | | | 166/387 |

* cited by examiner

CONTROLLED DEPLOYMENT OF SHAPE-MEMORY ARTICLES

BACKGROUND

Shape-memory polymers (SMPs) are polymers that regain their original shape when heated above their glass transition temperature (Tg). Articles are formed from shape-memory polymers by first heating above the glass transition temperature and shaping the polymer, then subsequently fixing the shape by cooling to below the glass transition temperature. During deployment, the shaped articles are heated above the glass transition temperature or slightly below the glass transition temperature to allow recovery of the first molded shape. In addition to temperature change, the shape-memory effect can also be triggered by an electric or magnetic field, light, contact with a particular fluid or a change in pH.

Shape-memory polymers are useful as materials of construction of elements for a variety of downhole applications, particularly those that require the sealing off of a portion of a borehole or constricting the spacing around an element, whether coaxial with the borehole or otherwise. Shape-memory polymers can also be used in sand control applications.

However, to deploy shape-memory articles downhole, dedicated pumping operations are often required, which can be time consuming and complex for certain applications. Accordingly, alternative effective methods to deploy shape-memory articles are continuously sought.

SUMMARY

A downhole assembly includes: a support structure; a shape-memory article disposed at the support structure; and a deployment control element adjacent the shape-memory article, the deployment control element having a permeable or degradable wall defining a chamber and an activation material disposed in the chamber.

A method includes: introducing into a wellbore a downhole assembly including a support structure; a shape-memory article disposed at the support structure and including a shape-memory polymer; and a deployment control element adjacent the support structure, the deployment control element having a permeable or degradable wall defining a chamber and an activation material disposed in the chamber, wherein the downhole assembly is disposed when the shape-memory article is in a compacted shape; exposing the downhole assembly to a wellbore fluid; releasing the activation material from the deployment control element; and contacting the shape-memory article in the compacted shape with the released activation material to cause the shape-memory article to expand, and conform to a surface of the wellbore.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Downhole assemblies and methods for deploying and using these assemblies (e.g., filtering sand and other undesirable material from fluid in a downhole environment) are described herein.

The downhole assemblies have a deployment control element installed within the assemblies. Once the downhole assemblies are placed at the desired location, an activation material can be released from the built-in deployment control element to activate a shape-memory article in the assemblies. The shape-memory article then expands and conforms to a surface of the wellbore.

The assemblies and methods described herein allow for a shape-memory article to activate on its own without the need for additional pumping operations or downhole heating equipment. Achieving this can save the end user time and simplify the installation operations. The assemblies and methods also have significant environmental benefits since direct handling of volatile activation fluid is avoided.

Figure 1:
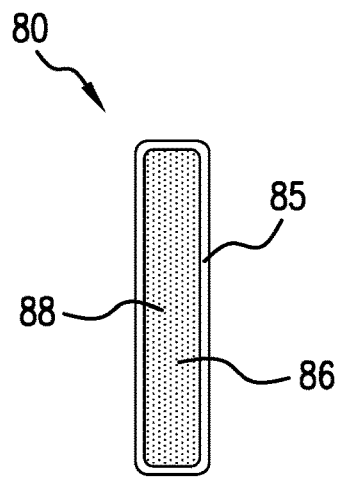
FIG. 1 illustrates a deployment control element according to an embodiment of the disclosure.

FIG. 1 illustrates a deployment control element according to an embodiment of the disclosure. The deployment control element (80) has a degradable or permeable wall (85) defining a chamber (88). As used herein, a degradable or permeable wall includes the instance where a wall is both degradable and permeable.

A permeable wall can have a porous structure and allow a liquid, for example, a wellbore fluid, to enter and leave the chamber (88). The material for a permeable wall is not particularly limited and can be degradable or non-degradable.

A degradable wall can degrade in the presence of a wellbore fluid, for example a wellbore fluid that contains water, a brine, or an acid. The material for the degradable wall can include a polymer, a metallic material, or a composite. The metallic material can comprise at least one of Zn, Mg, Al, Mn, or an alloy thereof. The metallic material can further comprise at least one of Ni, W, Mo, Cu, Fe, Cr, Co, or an alloy thereof.

The degradable wall can comprise degradable polymers and their composites including poly(lactic acid) (PLA), poly(glycolic acid) (PGA), polycaprolactone (PCL), polylactide-co-glycolide, polyurethane such as polyurethane having ester or ether linkages, polyvinyl acetate, polyesters. The degradable wall can include more than one degradable polymer.

In the deployment control element (80), an activation material (86) is disposed in the chamber (88). Preferably, the activation material (86) is in the form of a solid, a hydrogel, or an xerogel. The activation material can contain an activator, which is a material that is effective to reduce the glass transition temperature and/or rigidity of shape-memory polymers. Examples of the activator can include dimethyl sulfoxide, ketones, alcohols, phenols, ethers, esters, or acids. More than one activator can be used. As used herein, an alcohol refers to an organic compound having one or more hydroxyl groups attached to a saturated carbon atom. Examples of the alcohols include methanol, ethanol, isopropyl alcohol, n-butanol, 2-butanol, isobutanol, tert-butanol, n-pentanol, isopentanol, 2-pentanol, hexanol, octanol, isooctanol, cyclohexanol, 2-methyl-1-butanol, 2-methyl-1-pentanol, 3-methyl-2-butanol, 2-ethylhexanol, or glycols. The alcohol can be substituted and include ethoxylated alcohols, propoxylated alcohols, ethoxylated or propoxylated alcohols, or 2-butoxyethanol. The ethoxylated and/or propoxylated alcohols can have a structure represented by the Formula R—$(OCH_2CH_2)_m(OCH_2CH_2CH_2)_n$—OH, wherein R is a $C_{1-7}$ alkyl, $C_{1-5}$ alkyl, $C_{1-3}$ alkyl, or ethyl, m is 0 to 8, and n is 0 to 8, provided that the sum of m and n is at least 1.

Examples of glycols include ethylene glycol, propylene glycol, 1,3-propanediol, 1,4-butanediol, 1,2,4-butanetriol, glycerin, erythritol, ethoxylated glycols, propoxylated glycols, ethoxylated or propoxylated glycols, diethylene glycol, or butoxy tri-glycol. Phenols can be substituted and include ethoxylated phenols, propoxylated phenols, or ethoxylated or propoxylated phenols.

Examples of esters include n-butyl acetate, n-butyl propionate, n-propyl propionate, n-pentyl propionate, or ethylene glycol monoethyl ether acetate. Exemplary ethers include ethylene glycol monobutyl ether (EGMBE). Specific ketones include acetone and acetylacetone. Examples of acids include adipate or maleate.

For an activator that is normally a liquid at room temperature, a modifying agent can be used to covert the liquid activator to a solid, hydrogel, or xerogel (modified activator). The activator can be controllably released from the powder, hydrogel, or xerogel by dissolving or corroding the modifying agent in water or brine.

Suitable modifying agents include those that are dissolvable in water or brine. As used herein, a material is dissolvable means that the material is soluble in water or brine or reacts with water or brine to form compounds that are soluble in water or brine. A compound is soluble if it dissolves in water or brine to provide a solution with a concentration of at least 0.001 moles per liter at room temperature for example at 23° C.

Modifying agents can include soluble silicates, carbohydrates, gelatin, polyvinyl alcohol, polyvinylpyrrolidione, polyacrylic acid, or a combination thereof. Carbohydrates include saccharides such as monosaccharides, disaccharides, trisaccharides, oligosaccharides or polysaccharides, derivatives, or combinations thereof. These polysaccharides can be linear (cellulose, amylose), and/or branched (amylopectin, glycogen). The polysaccharides can include carboxyl groups (pectin, alginate, carboxymethyl cellulose) or strongly acidic groups (furcellaran, carrageenan or modified starch). The polysaccharides can also be modified chemically by derivatization with neutral substituents (in the case of methyl ethyl cellulose or hydroxypropyl cellulose for instance) or acidic substituents (with carboxymethyl, sulfate or phosphate groups).

The modifying agents can comprise gums and/or hydrocolloids, e.g. gum arabic, gum tragacanth, karaya gum, seaweed or shell extracts like agar, carrageenan, fucoidan, alginic acid, laminaran, furcellaran and/or chitosan, or microbial polysaccharides e.g. dextran, pulltilan, elsinan, curdlan, scleroglucan, levan, xanthan, gellan, welan gum, or rhamsan gum. Gum ghatti, karaya gum, laminaran or pectins may be used in the modifying material.

In an embodiment, the carbohydrate includes a cellulose, a cellulose derivative, a starch, or a starch derivative. A starch derivative includes hydrophobically modified starch such as an alkenyl-succinated starch and starch hydrolysate such as dextrins or maltodextrins, starch ethers, starch esters, crosslinked starch, or oxidized starch. Cellulose derivatives include hydroxymethyl cellulose, hydroxyethyl cellulose, hydroxypropyl cellulose, hydroxypropylmethyl cellulose, methyl cellulose, ethyl cellulose, carboxymethyl cellulose, or sodium carboxymethyl cellulose. Combinations of the materials can be used.

Dissolvable silicates are generally not distinct stoichiometric chemical substances. The dissolvable silicate can comprise about 55 to about 80 wt. % of $SiO_2$, 0 to about 35 wt. % of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, about 20 wt. % to about 35 wt. %, or about 22 wt. % to about 33 wt. %, wherein each weight percent is based on the total weight of the dissolvable silicates.

Modified activators in a powder form can include particles such as capsules having a shell comprising the modifying agent and a core comprising the activator. Alternatively, the modified activators in a powder form can include particles such as capsules having a shell comprising the activator and a core comprising the modifying agent. In this instance, the modifying agent in the core can function as a nucleation site for the activator to form a solid material.

In some embodiments, the particles of the modified activators do not have a core/shell structure. For example, particles of the modified activators include modifying agent particulates and an activator absorbed or adsorbed in the particulates of the modifying agent.

The modified activators can be formed by spray drying, spray chilling and cooling, coacervation, encapsulation, fluidized bed coating, rotational suspension separation, pan coating, air suspension coating, centrifugal extrusion, or vibrational nozzle. Exemplary methods have been described in US. 2008/0206325 and U.S. Pat. No. 3,956,508. Modified activators can also be prepared using commercially available instruments such as ENCAPSULATOR B-390/B-395 pro.

Hydrogels can be prepared by blending an activator with a soluble silicate and an acid such as phosphoric acid, and separating the sol. Hydrogels can be converted to xerogels when they are dried.

The deployment control element can be installed in various downhole assemblies. The downhole assemblies include a support structure; a shape-memory article disposed at the support structure; and a deployment control element as described herein adjacent the shape-memory article. As used herein, "disposed at" means that the shape-memory article can surround the support structure, partially surround the support structure, or couple to the support structure without surrounding or partially surrounding the support structure. For example, the shape-memory article can be coupled to the end of the support structure. The support structure can be a tubular member having a fluid conduit defined therein, for example, a pipe (e.g. perforated base pipe), tubing, or string. In an embodiment, the support structure is a base pipe having a portion that is perforated or slotted, and the shape-memory article is disposed at or at least partially surrounds the perforated or slotted portion of the base pipe.

The deployment control element can be disposed on the shape-memory article, positioned between the support structure and the shape-memory article, mounted on the support structure, or otherwise installed adjacent the shape-memory article.

Figure 2:
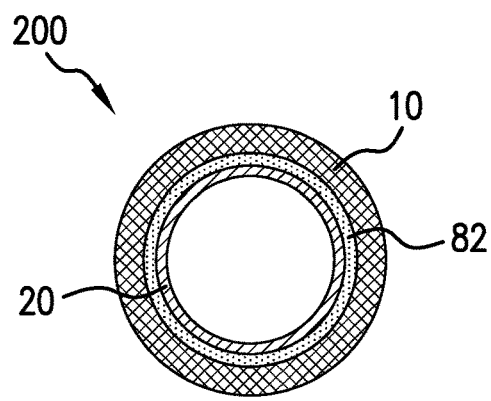
FIG. 2 illustrates a cross-sectional view of a downhole assembly comprising a deployment control element positioned between a support structure and a shape-memory article.

FIG. 2 illustrates a cross-sectional view of a downhole assembly according to an embodiment of the disclosure. The downhole assembly (200) comprises a support structure (20), and a shape-memory article (10) disposed at the support structure (20). In the downhole assembly (200), a deployment control element (82) is positioned between the support structure (20) and the shape-memory article (10).

Figure 3:
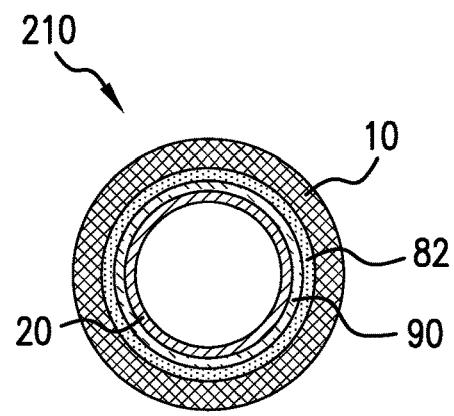
FIG. 3 illustrates a cross-sectional view of a downhole assembly comprising a deployment control element positioned between a screen and a shape-memory article.
Figure 4:
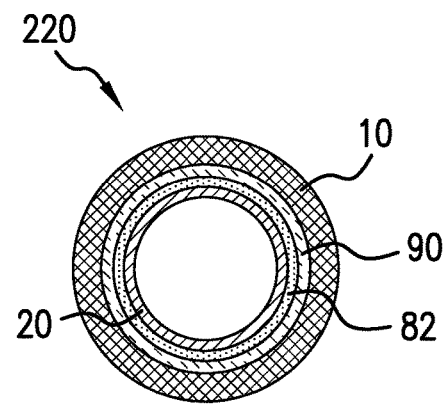
FIG. 4 illustrates a cross-sectional view of a downhole assembly comprising a deployment control element positioned between a support structure and a screen.

As shown in FIGS. 3 and 4, the downhole assembly (210, 220) can further include a screen (90) between the support structure (20) and the shape-memory article (10). A screen refers to a medium in which solids can be filtered from a fluid. The screen can be a wire wrapped screen, or a slotted liner. The screen can also be in a mesh form. A deployment control element (82) can be positioned between the screen (90) and the shape-memory article (10) as shown in FIG. 3 or between the support structure (20) and the screen (90) as shown in FIG. 4. The deployment control element (82) can be present as a one piece element as shown in FIGS. 2-4. Alternatively, a downhole assembly can include several separate deployment control elements independently disposed adjacent the shape-memory article, for example, between the support structure and the screen or between the support structure and the shape-memory article.

Figure 5:
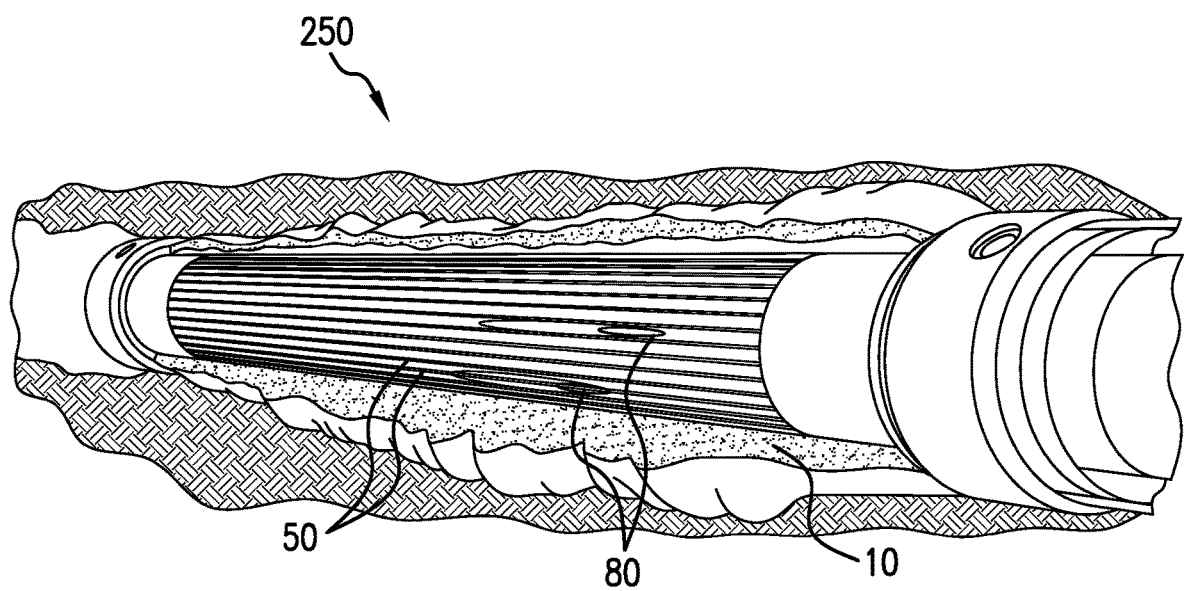
FIG. 5 is a partial cut-away view of a downhole assembly comprising a deployment control element positioned between two neighboring spaced ribs.
Figure 6:
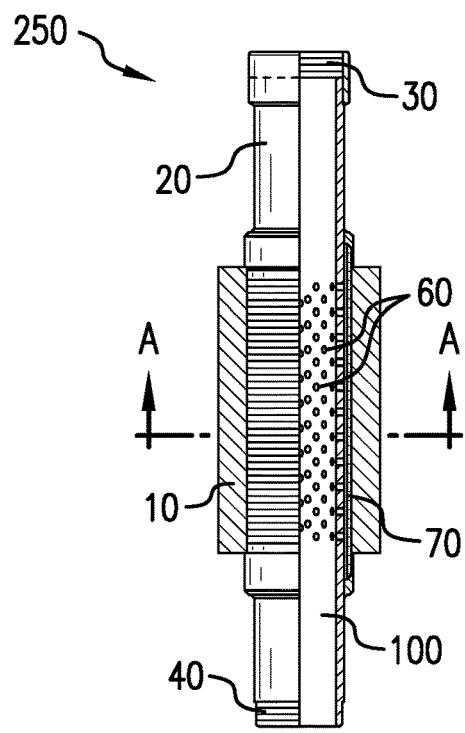
FIG. 6 is a side-view of the downhole assembly of FIG. 5.
Figure 7:
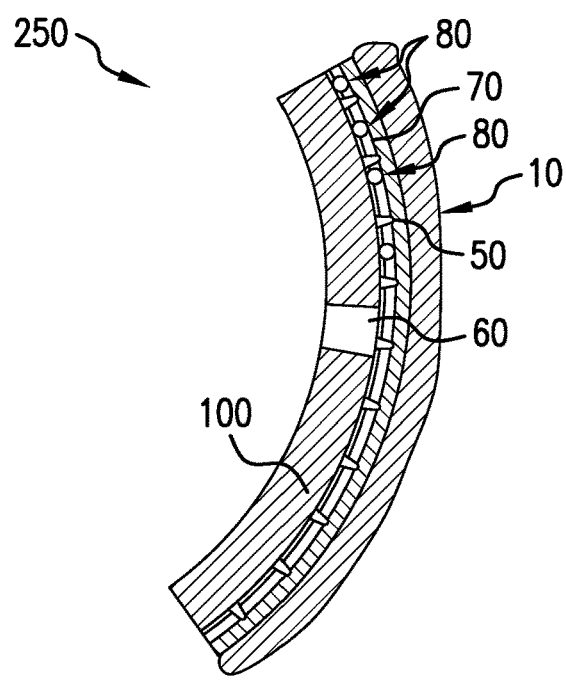
FIG. 7 is a partial cross-sectional view of the downhole assembly in FIG. 6 along line A-A.

FIGS. 5-7 illustrate a downhole assembly having a wire wrapped screen. The downhole assembly (250) includes a support structure (20), which can optionally have two threaded ends (30 and 40) to attach the support structure to other tubular members such as a production pipe string (not shown). In the illustrated downhole assembly (250), the support structure (20) is a tubular member having a perforated portion having a plurality of openings (60) on a tubular wall (100). The size and shape of the openings are not limited and can be selected to provide a substantial area for flow of fluids and to maintain the structural integrity of the support structure. The downhole assembly also includes a wire wrapped screen surrounding the perforated portion of the support structure. The screen in the downhole assembly includes a plurality of spaced ribs or rib wires (50), around which a wire (70) is wrapped in spaced coils. The wrapping wire (70) can be welded to the rib wires (50) if needed. The downhole assembly (250) also includes a shape-memory article (10) disposed on the wire based screen. One or more deployment control element (80) can be independently positioned between at least one pair of adjacent spaced ribs (50).

The shape-memory article (10) can comprise a shape-memory polymer such as polyurethanes, epoxies, acrylates, nylon, polypropylene, polyesters, polytetrafluoroethylene, polyether ether ketone, polyamides, polyureas, polyvinyl alcohols, vinyl alcohol-vinyl ester copolymers, phenolic polymers, polybenzimidazoles, polystyrenes, a crosslinked polymer such as a crosslinked polytetrafluoroethylene, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, a cross-linked product of a polyphenylene sulfide and a polyphenylsulfone, a crosslinked polyphenylene sulfide, a crosslinked polyaryletherketone, a crosslinked polyether ketone, a crosslinked polyethersulfone (PESU), a crosslinked polyphenylenesulfone (PPSU), or a crosslinked polyphenylenesulfone urea. The shape-memory article can comprise more than one shape-memory polymer. Shape-memory polymers that may be used are not limited to the examples described herein, as other materials may be selected based on considerations such as downhole temperature, types of substances encountered downhole, and activation materials, etc. The shape-memory article can be a foam. For filtering such as sand control applications, the shape-memory article can be an open cell foam or a foam having both open and closed cells. Bulk shape-memory polymer can also be used.

In an aspect, the shape-memory article is a polyurethane foam. The polyurethane foam can be extremely tough and strong and is capable of being compressed and returned to substantially its original non-compressed shape. The polyurethane foam material can be made from one or more polyol components, such as, but not limited to, a polyether, polyester or polycarbonate-based di- or multifunctional hydroxyl-ended prepolymer or polyol, and at least one isocyanate component, including, for example, a modified isocyanate (MI) or a modified diphenylmethane diisocyanate (MDI) based monomeric diisocyanate or polyisocyanate, as well as other additives such as blowing agents, molecular cross linkers, chain extenders, surfactants, colorants and catalysts.

To avoid premature expansion during run-in, the shape-memory polymers can have a glass transition temperature that is about 20° C. or about 30° C. higher than the actual downhole deployment/application temperature.

Before deployment, the shape-memory article is in a compacted shape. Compacted shape-memory article can be made by compressing or stretching the polymers with a mechanical force at a temperature greater than the glass transition temperature of the polymer. While still in the compacted state, the material is cooled down to a temperature below its glass transition temperature. The shape-memory polymers remain in the compacted shape induced on it after manufacture at surface temperature or at wellbore temperature during run-in.

The downhole assemblies described herein can be installed by introducing the downhole assemblies into a wellbore; exposing the downhole assemblies to a wellbore fluid; releasing the activation material from the deployment control element; and contacting the shape-memory article in the compacted shape with the released activation material to cause the shape-memory article to expand, and conform to a surface of the wellbore.

The wellbore fluid can comprise water or a brine. The brine can comprise potassium chloride (KCl), hydrochloric acid (HCl), calcium chloride ($CaCl_2$), calcium bromide ($CaBr_2$) or zinc bromide ($ZnBr_2$), or a combination comprising at least one of the foregoing. In an aspect, the wellbore fluid is a drilling fluid or a completion fluid. The wellbore fluid can be present in the wellbore before the downhole assemblies are introduced into a wellbore. Once the downhole assemblies are placed in the desired location, the activation material and the activator can be released, preferably in a liquid form. For example, when the deployment control element has a permeable wall, wellbore fluid can enter the chamber to dissolve the activation material and/or the activator. The dissolved activation material and/or the activator can then leach out of the deployment control element. When the deployment control element has a degradable wall, the wall can degrade in the presence of the wellbore fluid, and release the activation material and/or the activator. The modifying agent, if used, can also dissolve or corrode in the wellbore fluid. Optionally, the activation material and/or the activator is released in the presence of sonication or an electromagnetic field.

The released activation material or activator can contact the shape-memory polymer and cause the shape-memory article to expand in the radial direction and conform to the wall of a wellbore to provide an expanded shape-memory article.

When the shape-memory polymer is a polymer foam, as a result of the shape-memory polymer being expanded to its set position, the open cell porous shape-memory foam can prevent production of undesirable solids and allow only desired hydrocarbon fluids to flow through the shape-memory foam. The foam cell pore size, size distribution and cell openness may be adjusted by formulating different components and by controlling processing conditions in such a way that only desired hydrocarbon fluids are allowed to flow through and undesirable solids (sands, formation fines/particles, etc.) in the wellbore are prevented from being produced.

Set forth below are some embodiments of the foregoing disclosure:

Aspect 1. A downhole assembly comprising: a support structure; a shape-memory article disposed at the support structure; and a deployment control element adjacent the shape-memory article, the deployment control element comprising a permeable or degradable wall defining a chamber and an activation material disposed in the chamber.

Aspect 2. The downhole assembly as in any prior aspect, wherein the activation material is in the form of a solid, a hydrogel, or an xerogel.

Aspect 3. The downhole assembly as in any prior aspect, wherein the activation material comprises an activator, and the activator comprises at least one of dimethyl sulfoxide, a ketone, an alcohol, a phenol, an ether, an ester, or an acid.

Aspect 4. The downhole assembly as in any prior aspect, wherein the activation material comprises an activator and a modifying agent comprising at least one of a soluble silicate, a carbohydrate, gelatin, a polyvinyl alcohol, a polyvinylpyrrolidione, a polyacrylic acid, or a polyvinyl acetate.

Aspect 5. The downhole assembly as in any prior aspect, wherein the deployment control element has a permeable wall with a porous structure.

Aspect 6. The downhole assembly as in any prior aspect, wherein the deployment control element has a degradable wall.

Aspect 7. The downhole assembly as in any prior aspect, further comprising a screen between the shape-memory article and the support structure.

Aspect 8. The downhole assembly as in Aspect 7, wherein the deployment control element is positioned between the support structure and the screen.

Aspect 9. The downhole assembly as in Aspect 7, wherein the deployment control element is positioned between the screen and the shape-memory article.

Aspect 10. The downhole assembly as in Aspect 7, wherein screen comprises a plurality of spaced ribs and a wire wrapped around the plurality of the spaced ribs.

Aspect 11. The downhole assembly as in Aspect 10, wherein the deployment control element is positioned between at least one pair of adjacent spaced ribs.

Aspect 12. The downhole assembly as in Aspect 10 or Aspect 11, comprising more than one deployment control elements, wherein each deployment control element is independently positioned between a pair of adjacent spaced ribs.

Aspect 13. A method comprising: introducing into a wellbore a downhole assembly comprising a support structure; a shape-memory article disposed at the support structure and comprising a shape-memory polymer, and a deployment control element adjacent the support structure, the deployment control element comprising a permeable or degradable wall defining a chamber and an activation material disposed in the chamber, wherein the downhole assembly is disposed when the shape-memory article is in a compacted shape; exposing the downhole assembly to a wellbore fluid; releasing the activation material from the deployment control element; and contacting the shape-memory article in the compacted shape with the released activation material to cause the shape-memory article to expand, and conform to a surface of the wellbore.

Aspect 14. The method as in any prior aspect, wherein the wellbore fluid comprises water or a brine.

Aspect 15. The method as in any prior aspect, wherein the activation material is in the form of a solid, a hydrogel, or an xerogel, the activation material comprises an activator, and the activator comprises at least one of dimethyl sulfoxide, a ketone, an alcohol, a phenol, an ether, an ester, or an acid.

Aspect 16. The method as in any prior aspect, wherein the wellbore fluid enters the chamber of the deployment control element and contacts the activation material.

Aspect 17. The method as in any prior aspect, wherein releasing the activation material comprises dissolving an activator in the activation material with the wellbore fluid.

Aspect 18. The method as in any prior aspect, wherein releasing the activation material comprises degrading the wall of the deployment control element with the wellbore fluid.

The use of the terms "a" and "an" and "the" and similar referents in the context of describing the invention (especially in the context of the following claims) are to be construed to cover both the singular and the plural, unless otherwise indicated herein or clearly contradicted by context. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:
1. A downhole assembly comprising:
   a support structure;
   a shape-memory article disposed at the support structure;

a deployment control element adjacent the shape-memory article, the deployment control element comprising a permeable wall defining a chamber and an activation material disposed in the chamber; and a screen between the shape-memory article and the support structure, the screen comprising a plurality of spaced ribs and a wire wrapped around the plurality of the spaced ribs, the deployment control element being positioned between at least one pair of adjacent spaced ribs.

2. The downhole assembly of claim 1, wherein the activation material is in the form of a solid, a hydrogel, or an xerogel.

3. The downhole assembly of claim 1, wherein the activation material comprises an activator, and the activator comprises at least one of dimethyl sulfoxide, a ketone, an alcohol, a phenol, an ether, an ester, or an acid.

4. The downhole assembly of claim 1, wherein the activation material comprises an activator and a modifying agent comprising at least one of a soluble silicate, a carbohydrate, gelatin, a polyvinyl alcohol, a polyvinylpyrrolidione, a polyacrylic acid, or a polyvinyl acetate.

5. The downhole assembly of claim 1, wherein the deployment control element has a permeable wall with a porous structure.

6. The downhole assembly of claim 1, wherein the permeable wall is degradable.

7. The downhole assembly of claim 1, wherein the deployment control element is positioned between the support structure and the screen.

8. The downhole assembly of claim 1, wherein the deployment control element is positioned between the screen and the shape-memory article.

9. A method comprising:

introducing into a wellbore a downhole assembly as claimed in claim 1 and wherein the shape-memory article is in a compacted shape comprising:

exposing the downhole assembly to a wellbore fluid;

releasing the activation material from the deployment control element; and contacting the shape-memory article in the compacted shape with the released activation material to cause the shape-memory article to expand, and conform to a surface of the wellbore.

10. The method of claim 9, wherein the wellbore fluid comprises water or a brine.

11. The method of claim 9, wherein the activation material is in the form of a solid, a hydrogel, or an xerogel, the activation material comprises an activator, and the activator comprises at least one of dimethyl sulfoxide, a ketone, an alcohol, a phenol, an ether, an ester, or an acid.

12. The method of claim 9, wherein the wellbore fluid enters the chamber of the deployment control element and contacts the activation material.

13. The method of claim 12, wherein releasing the activation material comprises dissolving an activator in the activation material with the wellbore fluid.

14. The method of claim 9, wherein the permeable wall is degradable.

15. The method of claim 14, wherein releasing the activation material comprises degrading the permeable wall of the deployment control element with the wellbore fluid.

16. A downhole assembly comprising:

a support structure;

a shape-memory article disposed at the support structure;

more than one deployment control element adjacent the shape-memory article, the more than one deployment control elements each comprising a permeable wall defining a chamber and an activation material disposed in the chamber; and a screen between the shape-memory article and the support structure wherein the screen comprises a plurality of spaced ribs and a wire wrapped around the plurality of the spaced ribs, wherein each deployment control element is independently positioned between a pair of adjacent spaced ribs.

* * * * *